(12) United States Patent
Park et al.

(10) Patent No.: US 8,502,933 B2
(45) Date of Patent: Aug. 6, 2013

(54) BACKLIGHT UNIT HAVING FIXED AND REMOVABLE METAL CORE PRINTED CIRCUIT BOARD AND LIQUID CRYSTAL DISPLAY MODULE HAVING THE SAME

(75) Inventors: Jin-Hee Park, Cheonan-si (KR); Tae-Seok Jang, Seoul (KR); Seok-Won Kang, Cheonan-si (KR); Yong-Woo Lee, Suwon-si (KR); Ju-Young Yoon, Seoul (KR); Jae-Joong Kwon, Suwon-si (KR); Seung-Hwa Ha, Cheongju-si (KR)

(73) Assignee: Samsung Display Co., Ltd. (KR)

( * ) Notice: Subject to any disclaimer, the term of this patent is extended or adjusted under 35 U.S.C. 154(b) by 164 days.

(21) Appl. No.: 13/084,635

(22) Filed: Apr. 12, 2011

(65) Prior Publication Data
US 2011/0249217 A1    Oct. 13, 2011

(30) Foreign Application Priority Data
Apr. 12, 2010    (KR) .................. 10-2010-0033361

(51) Int. Cl.
*G02F 1/1333*    (2006.01)
*G02F 1/1335*    (2006.01)

(52) U.S. Cl.
USPC .............. 349/58; 349/69; 362/631; 362/632; 362/633; 362/634; 362/97.3

(58) Field of Classification Search
USPC .............. 349/58, 65, 69; 362/631, 632, 633, 362/634, 97.3
See application file for complete search history.

(56) References Cited

U.S. PATENT DOCUMENTS

| | | | |
|---|---|---|---|
| 6,497,939 B1* | 12/2002 | Obuchi et al. ................. | 428/156 |
| 2007/0165425 A1* | 7/2007 | Sakamoto et al. ............ | 362/633 |
| 2008/0239754 A1* | 10/2008 | Kang et al. .................... | 362/617 |
| 2010/0073959 A1* | 3/2010 | Hamada ........................ | 362/611 |
| 2010/0283936 A1* | 11/2010 | Ji et al. ............................ | 349/58 |

\* cited by examiner

*Primary Examiner* — Michael Caley
(74) *Attorney, Agent, or Firm* — Cantor Colburn LLP

(57) ABSTRACT

A backlight unit includes a mold frame, a metal core printed circuit board ("MCPCB") on which at least one light emitting diode ("LED") is mounted, a reflector, a light guide plate, and an optical sheet. The mold frame includes an MCPCB fixing portion, the MCPCB is directly and removably disposed on the MCPCB fixing portion, and a lower surface of the MCPCB is exposed to the outside of the mold frame. On the MCPCB, a reflector, a light guide plate, and an optical sheet are placed in the order named. The light guide plate has a light entering surface facing the LED.

16 Claims, 4 Drawing Sheets

A BACKLIGHT UNIT HAVING FIXED AND REMOVABLE METAL CORE PRINTED CIRCUIT BOARD AND LIQUID CRYSTAL DISPLAY MODULE HAVING THE SAME

This application claims priority to Korean Patent Application No. 10-2010-0033361 filed on Apr. 12, 2010, and all the benefits accruing therefrom under 35 U.S.C. §119, the contents of which is herein incorporated by reference in its entirety.

BACKGROUND OF THE INVENTION (1) Field of Invention

The invention relates to a backlight unit of a liquid crystal display ("LCD"), and more particularly, relates to an edge type backlight unit using a light emitting diode ("LED").

(2) Background of the Invention

An LCD, a type of flat panel display, displays images by using liquid crystal material disposed between two insulating substrates. Because the liquid crystal display is light and consumes less power than other display devices, LCDs are widely used in various electronics such as television ("TV") sets, monitors, cell phones, and laptop computers. Since a liquid crystal panel employed in an LCD cannot generate light by itself, different from other display devices like a cathode ray tube ("CRT") and a plasma display panel ("PDP"), an independent light source providing the liquid crystal panel with light and a backlight unit having the light source are needed in an LCD.

A cold cathode fluorescent lamp ("CCFL"), flat fluorescent lamp ("FFL") etc. have been used as light source of a backlight unit. Recently, an LED draws attention since the LED is good in luminance and color reproduction, and does not raise a contamination problem. Especially, an LED is widely used in an LCD for a portable computer like a laptop computer, in which power consumption is of great importance because of its low power consumption.

A backlight unit of an LCD for a laptop computer using an LED as its light source adopts an edge type structure, where the backlight unit has a light guide plate around which LEDs are placed. In an edge type backlight unit having LEDs, LEDs are mounted on a flexible printed circuit ("FPC"). The FPC is attached to a lamp cover which is fixed to a mold frame. Such constitution makes the assembly of the backlight unit complex, and makes it difficult for the heat generated by LEDs to be emitted to an outside of the backlight unit and the liquid crystal display.

BRIEF SUMMARY OF THE INVENTION

An exemplary embodiment of the invention provides a light emitting diode ("LED") backlight unit which is easy to be assembled.

An exemplary embodiment of the invention provides an LED backlight unit which is good in emitting heat generated by the LED.

An exemplary embodiment of the invention provides a backlight unit including a single unitary indivisible mold frame, a metal core printed circuit board ("MCPCB") on which at least one LED is mounted, a reflector, a light guide plate, and an optical sheet. The mold frame includes an MCPCB fixing portion, the MCPCB is removably disposed on the MCPCB fixing portion, and a lower surface of the MCPCB is exposed to the outside of the mold frame. On the MCPCB, a reflector, a light guide plate, and an optical sheet are placed in the order named. The light guide plate has a light entering surface facing the LED.

An exemplary embodiment of the invention provides a liquid crystal display ("LCD") module including an LCD panel, a top chassis and a backlight unit, and the backlight unit includes an LED and an MCPCB of which the lower surface is exposed.

BRIEF DESCRIPTIONS OF THE DRAWINGS

The above and other elements of the invention will become more apparent by describing in detail exemplary embodiments thereof in reference to the attached drawings in which.

DETAILED DESCRIPTION OF THE INVENTION

Figure 1:
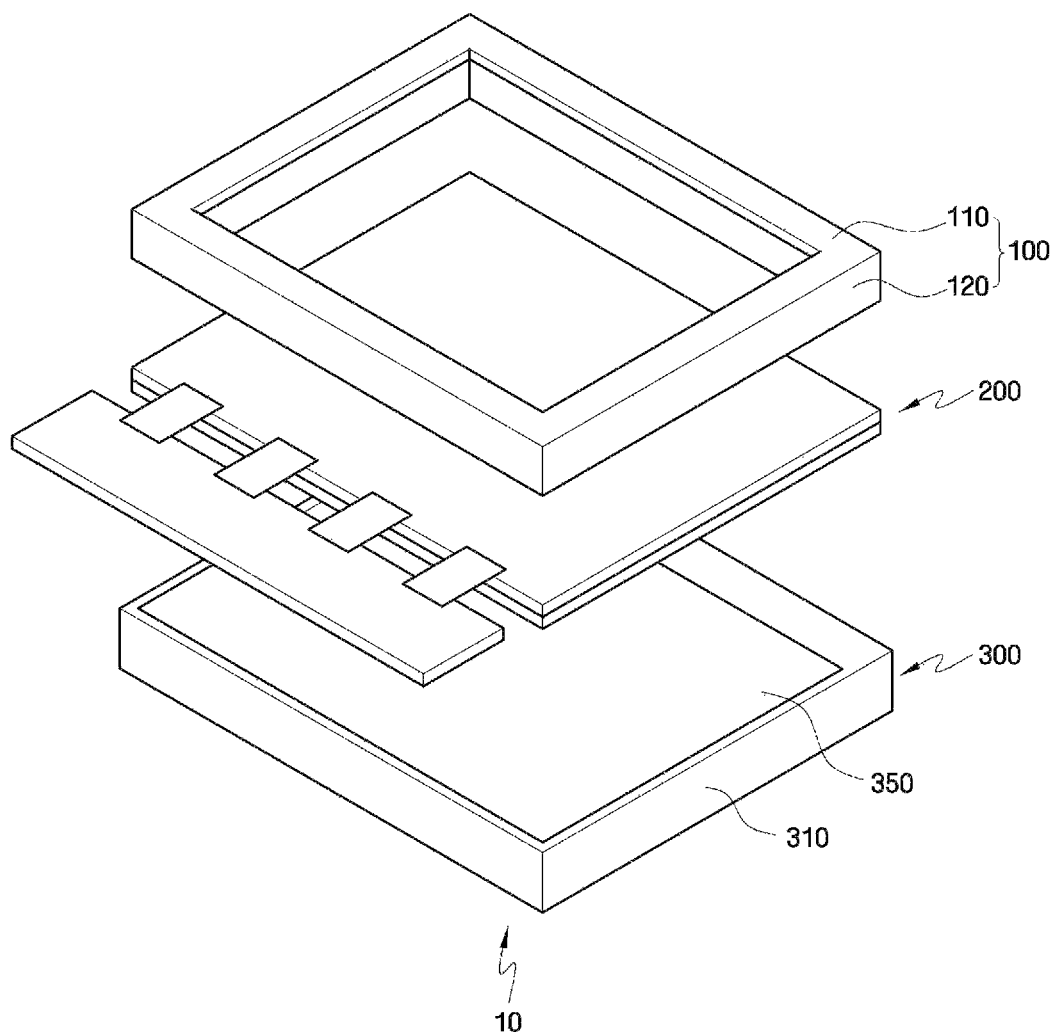
FIG. 1 is an exploded perspective view of an exemplary embodiment of an LCD module, according to the invention.

Hereinafter, embodiments of the invention will be described in detail with reference to the drawings. While the invention has been described using some exemplary embodiments, it should be understood that the presentation of the embodiments is not to restrict the scope of the invention into the embodiments, and that various changes, substitutions and alternations can be made without departing from the spirit and scope of the invention as defined by the appended claims. The same elements will be indicated with the same reference number.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

Now, an exemplary embodiment of a liquid crystal display ("LCD") module (10) according to the invention is described with reference to FIG. 1, showing an exploded perspective view of the LCD module.

The LCD module (10) includes a top chassis (100), an LCD panel (200) and a backlight unit (300). As can be seen from FIG. 1, the LCD panel (200) is placed so that it is supported by a panel supporting portion (315, refer to FIGS. 2 and 3) of a mold frame (310) of the backlight unit (300), and then the LCD panel (200) is fixed on the backlight unit (300) by a top chassis (100) which covers a circumference (e.g., a periphery) of an upper surface of the LCD panel (200).

The top chassis (100) may include a metal. The top chassis (100) may include a horizontal (e.g., upper) portion (110) covering the circumference of the upper surface of the LCD panel (200), and a vertical portion (120) contacting a side wall of the mold frame (310).

The top chassis (100) may be fixed to the backlight unit (300) by engaging the vertical portion (120) and the side wall of the mold frame (310). In one exemplary embodiment, the top chassis (100) may be combined to the mold frame (310) by a screw (not shown) at a vertical portion (120) and/or a horizontal portion (110).

Figure 2:
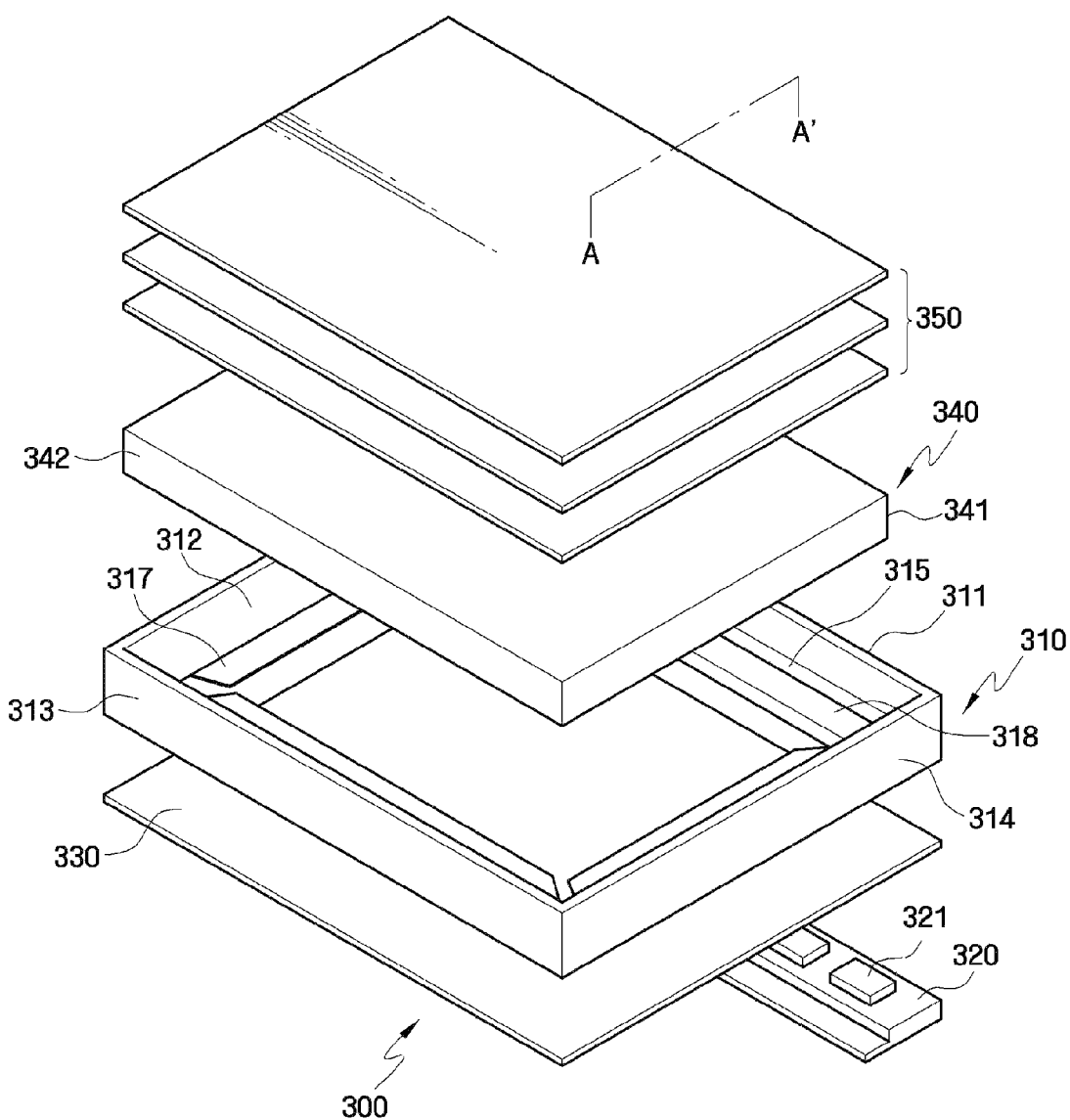
FIG. 2 is an exploded perspective view of an exemplary embodiment of a backlight unit, according to the invention.
Figure 3:
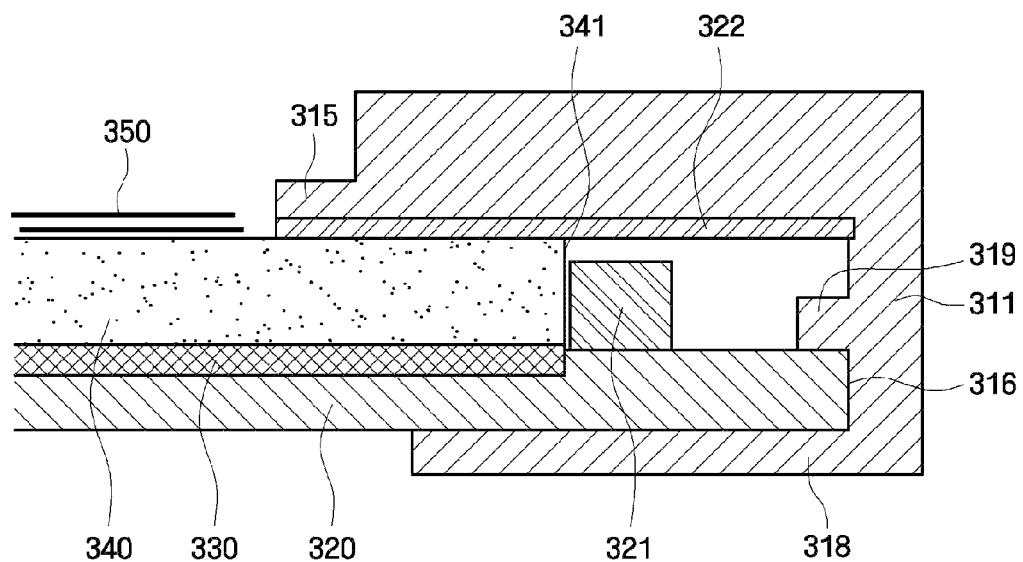
FIG. 3 is a cross-sectional view along line A-A' of FIG. 2.
Figure 4:
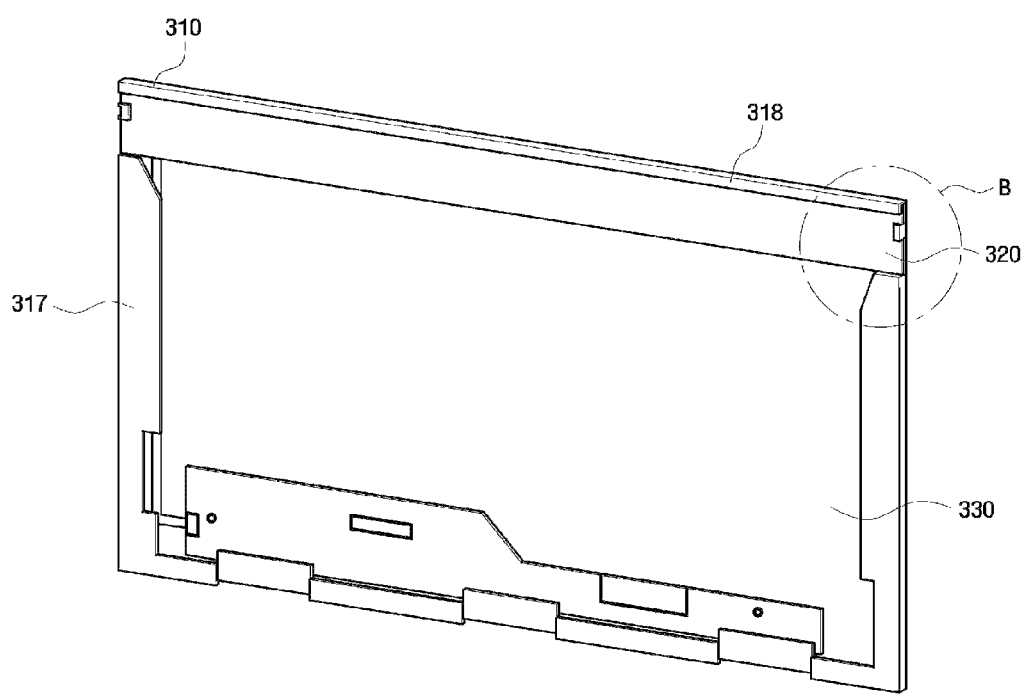
FIG. 4 is a rear view of an exemplary embodiment of a backlight unit, according to the invention.
Figure 5:
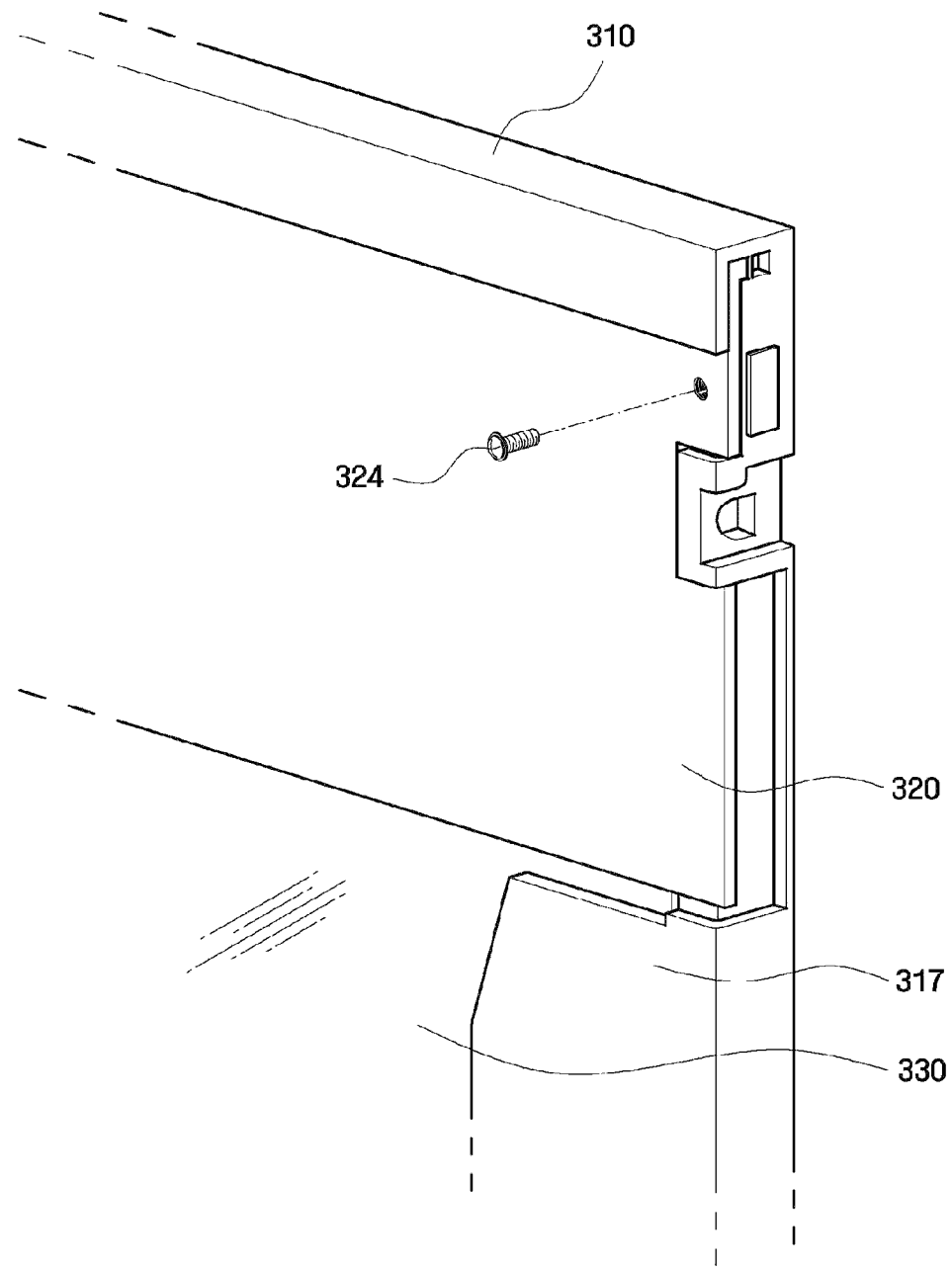
FIG. 5 is an enlarged view of portion "B" of the backlight unit described in FIG. 4.

Hereinafter, the backlight unit (300) according to the invention will be described referring to FIGS. 2 to 5. FIG. 2 shows an exploded perspective view of the exemplary embodiment a backlight unit, according to the invention. FIG. 3 is a cross-sectional view along line A-A' of the backlight unit described in FIG. 2. FIG. 4 is an exemplary embodiment of a rear view of a backlight unit, according to the invention. FIG. 5 is an enlarged view of portion "B" of the backlight unit described in FIG. 4.

A backlight unit (300) according to the invention may include a mold frame (310), a metal core printed circuit board ("MCPCB") (320), a reflector (330), a light guide plate (340) and a plurality of an optical sheet (350). At least one light emitting diode ("LED") (321) may be mounted on the MCPCB (320).

The mold frame (310) has a shape of a rectangular frame, and includes four side walls (311, 312, 313 and 314) to form a rectangle. A central portion of the mold frame (310) surrounded by the first, second, third and fourth side walls (311, 312, 313 and 314) is open, such as shown in FIG. 2. The panel supporting portion (315) configured to support an LCD panel (200) is disposed on an upper portion of each of the side walls (311, 312, 313 and 314). Extending from the first sidewall (311) is a base portion (318) disposed parallel with the panel supporting portion (315).

The first side wall (311) may include an MCPCB fixing portion (316) on which an MCPCB (320) including an LED, can be directly fixed. The MCPCB fixing portion (316) is defined by the first sidewall (311), the base portion (318), and an intermediate portion (319) disposed parallel with both the panel supporting portion (315) and the base portion (318). Opposing an inner vertical surface of the first sidewall (311), is an open portion of the MCPCB fixing portion (316) from which the MCPCB (320) extends towards a central portion of the backlight unit (300). Upper and lower surfaces of the MCPCB (320) directly contact the intermediate portion (319) and the base portion (318), as illustrated in FIG. 3.

First, second, third and/or fourth side wall (311, 312, 313 and 314) may further include a reflector supporting portion (317) configured to support a reflector (330) on a lower surface or portion of the reflector supporting portion (317). As illustrated in FIGS. 2 and 4, the reflector supporting portion (317) is disposed extending from only second, third and fourth side walls (312, 313 and 314), and not disposed extending from the first side wall (311). Conversely, the base portion (318) is disposed extending from only the first side wall (311).

The mold frame (310) may include a plastic material. The first, second, third and fourth side walls (311, 312, 313 and 314), the panel supporting portion (315), the intermediate portion (319), the base portion (318) and the reflector supporting portion (317) collectively form a single unitary indivisible member of the mold frame (310).

The MCPCB (320) is located directly on the MCPCB fixing portion (316) of the mold frame (310), and may be removably fixed to the second and/or fourth side walls (312, 314) at an end portion of the MCPCB (320), the end portion being close to the second and/or fourth side wall (312, 314), such as by a screw (324). Since the MCPCB fixing portion (316) is defined by the base portion (318), and an intermediate portion (319) disposed parallel with the panel supporting portion (315) and the base portion (318), the MCPCB (320) is also detachably disposed in the MCPBC fixing portion (316). In one exemplary embodiment, the MCPCB (320) is extended from the MCPCB fixing portion (316) and out of the open portion of the MCPCB fixing portion (316).

The MCPCB (320) and/or the base portion (318) may constitute a lowest part or surface of the backlight unit (300). A portion of a lower surface of the MCPCB (320) may be exposed to the outside of the backlight unit (300) and accordingly, heat generated by the LED (321) mounted on the MCPCB (320) can be effectively radiated out of the backlight unit (300). That is, the lower surface of the MCPCB (320) is directly exposed to the outside, and forms a lowermost surface of the backlight unit (300).

The reflector (330) is disposed to be supported by and contacting the MCPCB (320) and the reflector supporting portion (317).

The reflector (330) may be removably attached to the MCPCB (320) and/or the reflector supporting portion (317), such as by a tape (not shown) having adhesive on both sides. The reflector (330) may be a planar sheet, as illustrated in FIGS. 2-4.

The reflector supporting portion (317) may extend a portion of the respective side wall of the mold frame (310), as shown in FIG. 4. In contrast, the base portion (318) may extend an entire of a length of the first side wall (311), as shown in FIG. 4.

The light guide plate (340) is placed directly on and contacting the reflector (330). A light entering surface (341) of the light guide plate (340) faces the LED (321) mounted on the MCPCB (320). The light guide plate (340) may include patterns (not shown) of various shapes, on a lower surface of the light guide plate (340) facing the reflector (330). In an exemplary embodiment, a thickness of the light guide plate (340) may get smaller in a direction from the light entering surface (341) to an opposite surface (342).

The backlight unit (300) may include one or more of an optical sheet (350) disposed on the light guide plate (340). In an exemplary embodiment, the optical sheet (350) may include a diffuser and/or a prism sheet. The light guide plate (340) also includes a light emitting surface facing the optical sheet (350), side surfaces connecting the light entering surface (341) and the opposite surface (342), and a base surface facing the reflector (330).

The backlight unit (300) may include an LED reflector (322). The LED reflector (322) may have a cross-sectional shape of ⌐ or ⌊ (e.g., "L" or "C" shaped), and may be removably attached to the mold frame (310) by a tape (not shown) having adhesive on both sides.

In an exemplary embodiment of an edge type backlight unit structure, the backlight unit includes the light guide plate (340) including at least one light entering side surface (341) facing an LED (321) mounted on the MCPCB (320). Since the MCPCB (320) is directly on the MCPCB fixing portion (316) of the mold frame (310), and may be removably fixed to at least one side wall of the mold frame (310), an assembly of the backlight unit is simplified compared to a conventional edge type backlight unit including LEDs mounted on a flexible printed circuit ("FPC"), the FPC then being attached to a lamp cover which is further fixed to a mold frame. Furthermore, since a portion of a lower surface of the MCPCB (320) is exposed to the outside of the mold frame (310), heat generated by the LED (321) mounted on the MCPCB (320) can be effectively radiated out of the backlight unit (300).

What is claimed is:

1. A backlight unit, comprising:
a single unitary indivisible mold frame comprising:
a base portion and an intermediate portion extended from a first sidewall and parallel to each other, and a printed circuit board fixing portion defined by the base portion, the intermediate portion and the first sidewall;
a metal core printed circuit board on which at least one light emitting diode is mounted;
a reflector;
a light guide plate; and
an optical sheet;
wherein the metal core printed circuit board overlaps the base portion of the mold frame and is directly and removably disposed in the printed circuit board fixing portion of the first side wall, and a lower surface of the metal core printed circuit board is exposed to an outside of the mold frame when the metal core printed circuit board is disposed in the printed circuit board fixing portion and overlaps the base portion of the mold frame;
wherein the reflector, the light guide plate and the optical sheet are sequentially disposed on the metal core printed circuit board; and
wherein the light guide plate comprises a light entering surface facing the light emitting diode.

2. The backlight unit of claim 1, wherein the mold frame further comprises a panel supporting portion configured to support a liquid crystal display panel.

3. The backlight unit of claim 1, wherein the mold frame further comprises a reflector supporting portion spaced apart from the base portion, and a rear surface of the reflector contacts the metal core printed circuit board and the reflector supporting portion.

4. The backlight unit of claim 3, wherein the reflector is removably attached to the reflector supporting portion, the metal core printed circuit board or both the reflector supporting portion and the metal core printed circuit board, by an adhesive member having adhesive on both sides.

5. The backlight unit of claim 1, wherein the metal core printed circuit board comprises two opposing ends and is fixed to the mold frame by a screw at the ends.

6. The backlight unit of claim 1, wherein a thickness of the light guide plate is decreases from the light entering surface to a side opposite to the light entering surface.

7. The backlight unit of claim 1, wherein a pattern is disposed on a lower surface of the light guide plate.

8. The backlight unit of claim 1, further comprising a light emitting diode reflector disposed opposing the metal core printed circuit board with respect to the light emitting diode.

9. The backlight unit of claim 8, wherein the light emitting diode reflector has a cross-sectional shape of "L".

10. The backlight unit of claim 8, wherein the light emitting diode reflector is attached to the mold frame by an adhesive member having adhesive on both sides.

11. The backlight unit of claim 1, wherein the reflector overlaps the base portion of the mold frame, and the base portion exposes a lower surface of the reflector to the outside of the mold frame when the reflector, the light guide plate and the optical sheet are sequentially disposed on the metal core printed circuit board.

12. A liquid crystal display module, comprising:
a top chassis;
a liquid crystal display panel; and
a backlight unit;
wherein the backlight unit comprises:
a single unitary indivisible mold frame comprising a base portion and an intermediate portion extended from a first sidewall and parallel to each other, and defining a printed circuit board fixing portion of the first sidewall;
a metal core printed circuit board on which at least one light emitting diode is mounted;
a reflector;
a light guide plate; and
an optical sheet;
wherein the metal core printed circuit board overlaps the base portion of the mold frame and is directly and removably disposed in the printed circuit board fixing portion, and a lower surface of the metal core printed circuit board is exposed to an outside of the mold frame when the metal core printed circuit board is disposed in the printed circuit board fixing portion and overlaps the base portion of the mold frame;

wherein the reflector, the light guide plate and the optical sheet are sequentially disposed on the metal core printed circuit board; and wherein the light guide plate comprises a light entering surface facing the light emitting diode.

13. The liquid crystal display module of claim 12, wherein the top chassis comprises a vertical portion and a horizontal portion.

14. The liquid crystal display module of claim 13, wherein the top chassis is fixed to the backlight unit by the engagement of the vertical portion and the mold frame.

15. The liquid crystal display module of claim 13, wherein the top chassis is fixed to the backlight unit by a screw combining the vertical portion and the mold frame.

16. A method of forming an edge type backlight unit of a liquid crystal display, the method comprising:

providing a single unitary indivisible mold frame including a base portion and an intermediate portion extended from a first sidewall and parallel to each other, and defining a printed circuit board fixing portion of the first sidewall;

removably disposing a metal core printed circuit board on which at least one light emitting diode is mounted, in the printed circuit board fixing portion and overlapping the base portion, such that a lower surface of the metal core printed circuit board is exposed to an outside of the mold frame when the metal core printed circuit board is disposed in the printed circuit board fixing portion and overlaps the base portion of the mold frame; and sequentially disposing a reflector, a light guide plate and an optical sheet on the metal core printed circuit board, the light emitting diode facing a light incident side surface of the light guide plate.

* * * * *